United States Patent
Zhang et al.

(10) Patent No.: US 11,515,529 B2
(45) Date of Patent: Nov. 29, 2022

(54) CORE-SHELL ELECTROCHEMICALLY ACTIVE PARTICLES WITH MODIFIED MICROSTRUCTURE AND USE FOR SECONDARY BATTERY ELECTRODES

(71) Applicant: NAVITAS SYSTEMS, LLC, Woodbridge, IL (US)

(72) Inventors: Pu Zhang, Ann Arbor, MI (US); Peter Aurora, Ann Arbor, MI (US); Michael Wixom, Ann Arbor, MI (US)

(73) Assignee: Navitas Systems, LLC, Ann Arbor, MI (US)

( * ) Notice: Subject to any disclaimer, the term of this patent is extended or adjusted under 35 U.S.C. 154(b) by 389 days.

(21) Appl. No.: 16/487,183

(22) PCT Filed: Feb. 8, 2018

(86) PCT No.: PCT/US2018/017336
§ 371 (c)(1),
(2) Date: Aug. 20, 2019

(87) PCT Pub. No.: WO2018/156355
PCT Pub. Date: Aug. 30, 2018

(65) Prior Publication Data
US 2020/0411852 A1    Dec. 31, 2020

Related U.S. Application Data

(60) Provisional application No. 62/461,465, filed on Feb. 21, 2017.

(51) Int. Cl.
*H01M 4/38* (2006.01)
*H01M 4/587* (2010.01)
(Continued)

(52) U.S. Cl.
CPC .......... *H01M 4/386* (2013.01); *H01M 4/587* (2013.01); *H01M 4/623* (2013.01); *H01M 4/625* (2013.01);
(Continued)

(58) Field of Classification Search
None
See application file for complete search history.

(56) References Cited

U.S. PATENT DOCUMENTS 6,548,208 B1 * 4/2003 Kasamatsu ............ H01M 4/40
429/231.95
2007/0077490 A1    4/2007 Kim et al.
(Continued)

FOREIGN PATENT DOCUMENTS

CN    105406050 A    3/2016
JP    2005071655 A    3/2005
(Continued)

OTHER PUBLICATIONS

International Search Report and Written Opinion dated May 15, 2018.

*Primary Examiner* — Carlos Barcena
(74) *Attorney, Agent, or Firm* — Dinsmore & Shohl LLP; Weston R. Gould

(57) ABSTRACT

Provided are electrochemically active materials capable of absorbing and desorbing an ion suitable for use in secondary cells. The provided materials include a core consisting of a plurality of silicon particulates of a particle size less than 1 micrometer, the particulates intermixed with and surrounded by a silicon metal alloy composite, and an electrochemically active buffering shell layer enveloping at least a portion of the core such that the resulting electrochemically active material has an overall particle size with a maximum linear dimension of greater than one micrometer.

23 Claims, 10 Drawing Sheets

(51) Int. Cl.
  *H01M 4/62* (2006.01)
  *H01M 10/0525* (2010.01)
  *H01M 4/02* (2006.01)

(52) U.S. Cl.
  CPC .. *H01M 10/0525* (2013.01); *H01M 2004/021* (2013.01)

(56) References Cited

U.S. PATENT DOCUMENTS

2014/0127578 A1* 5/2014 Chung ................ H01M 4/1395
  429/218.1
2016/0043390 A1* 2/2016 Shin ..................... H01M 4/366
  427/122
2017/0104210 A1* 4/2017 Shin ..................... H01M 4/485

FOREIGN PATENT DOCUMENTS

| KR | 1020170015634 A | 2/2017 |
| KR | 1020170042937 A | 4/2017 |

* cited by examiner

CORE-SHELL ELECTROCHEMICALLY ACTIVE PARTICLES WITH MODIFIED MICROSTRUCTURE AND USE FOR SECONDARY BATTERY ELECTRODES

CROSS REFERENCE TO RELATED APPLICATIONS

This application depends from and claims priority to U.S. Provisional Application No. 62/461,465 filed Feb. 21, 2017, the entire contents of which are incorporated herein by reference.

FIELD

The disclosure relates generally to anode active materials suitable for use in primary or secondary electrochemical cells.

BACKGROUND

The use of silicon in electrochemical cells has gained significant traction due to is ability to absorb large amounts of lithium leading to a theoretical capacity of 4200 mAh/g. Silicon based anodes, however, suffer from shortened cycle life and reduced capacity as result of the relatively large volume changes that occur during battery cycling. Driven by the promise of low cost and high capacity, extensive global-wide efforts are yielding an understanding of the mechanisms leading to the failure and cycle life limitations that must be addressed for commercial adoption of silicon-based anodes into the transportation and grid markets.

Prior attempts to address these shortcomings of silicon based anodes has yielded development of various alloys, composites, and structures to the silicon materials. More recently, it has become apparent that nanostructure may lead to long cycle life. However, the approaches used to realize the required nanostructures have been limited to date by high precursor or reactant costs, non-scalable processing, and high first cycle irreversible losses. In particular, silane-based processes, which have emerged as the preferred synthetic route, require high cost reactants and processing equipment.

As such, new materials are needed with improved cycle life, capacity, and/or economic manufacturing. The provided materials address these concerns by employing a specifically tailored Si structure that combines with metals to form composites and which are formed into a core-shell structure by the presence of a carbon based shell thereby resulting in a material with excellent capacity and cycle life, yet is economical to produce and readily scaled to commercial applications.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are unique electrochemically active materials that are capable of absorbing and desorbing an ion suitable for use in primary or secondary electrochemical cells. The active materials include a core that includes a plurality of Si particulates surrounded by a matrix material that limits the surface Si volume change during cycling keeping the volumetric changes within the Si particulate structure. A second active or buffering layer is included that surrounds the core that may both or either act as an electrochemically active material itself and/or act as a second buffering layer to accommodate or limit volume changes during cycling. This unique core/shell structure improves cycle life and limits initial capacity loss thereby improving the performance of electrochemical cells employing the material as an active in one or more electrodes.

As such, provided are electrochemically active materials capable of absorbing and desorbing an ion, the material comprising: a core consisting of a plurality of silicon particulates of a particle size less than 1 micrometer, the particulates intermixed with and surrounded by a silicon metal alloy composite, and optionally not intermixed with the core; and an electrochemically active buffering shell layer, the shell enveloping at least a portion of the core; the material having a maximum linear dimension of greater than one micrometer. The metal in the silicon metal alloy is optionally selected from the group consisting of: Fe, Pb, Mg, Mn, Al, Ag, Au, Ti, Pt, Pd, Ru, Cu, Ni, Ro, or alloys thereof. The resulting silicon metal alloy is optionally conductive. Optionally, the shell includes carbon, optionally natural graphite, graphene, artificial graphite, expanded graphite, carbon fibers, hard carbon, carbon black, carbon nanotubes, fullerenes, activated carbon, or combinations thereof The overall dimensions of the electrochemically active particles may be greater than one micrometer.

Also provided are electrochemically active material capable of absorbing and desorbing an ion, the material including: a core consisting of a plurality of silicon particulates of a particle size less than 1 micrometer, the particulates intermixed with and surrounded by a silicon iron alloy composite; and an electrochemically active buffering shell layer comprising carbon, the shell enveloping at least a portion of the core; the material having a maximum linear dimension of greater than one micrometer.

Any of the electrochemically active materials as provided herein are optionally characterized by a cycle life of 80 percent capacity or greater at cycle 40, optionally at cycle 100. Any of the materials provided optionally are characterized by a specific capacity of at or greater than 800 mAh/g. Initial capacity loss is reduced by the provide particles, where any provided optionally are characterized by an initial capacity loss of 20% or less, optionally 12% or less. Any of the provided materials optionally have a surface area of 500 $m^2$/g or less, optionally 100 $m^2$/g or less. Any of the provided materials optionally are characterized by a tap density of 1.2 or less, optionally a tap density from 0.4 to 0.9. An overall particle size of any of the electrochemically active materials is optionally greater than 1 micrometer, optionally 1-100 micrometers, optionally 5-50 micrometers.

Also provide is an electrode optionally suitable for use as an anode in an electrochemical cell. The anode includes an electrochemically active materials as provided in any aspects of this section or as otherwise provided herein and a binder optionally selected from the group consisting of PVdF, CMC/SBR and LiPAA.

Also provided are electrochemical cells that include any of the electrochemically active materials as provided herein. An electrochemical cell optionally includes a cathode suitable for use in a lithium ion cell; an anode that includes an electrochemically active material as provided herein, optionally including a core consisting of a plurality of silicon particulates of a particle size less than 1 micrometer, the particulates intermixed with and surrounded by a silicon metal alloy composite, and optionally not intermixed with the core; and an electrochemically active buffering shell layer, the shell enveloping at least a portion of the core; the electrochemically active material having a maximum linear dimension of greater than one micrometer; and an electrolyte. The anode optionally further includes a binder optionally selected from the group consisting of PVdF, CMC/SBR and LiPAA. The electrochemical cell is optionally characterized by a cycle life of 80 percent capacity or greater at cycle 100, optionally at cycle 150.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings.

DETAILED DESCRIPTION

Figure 1:
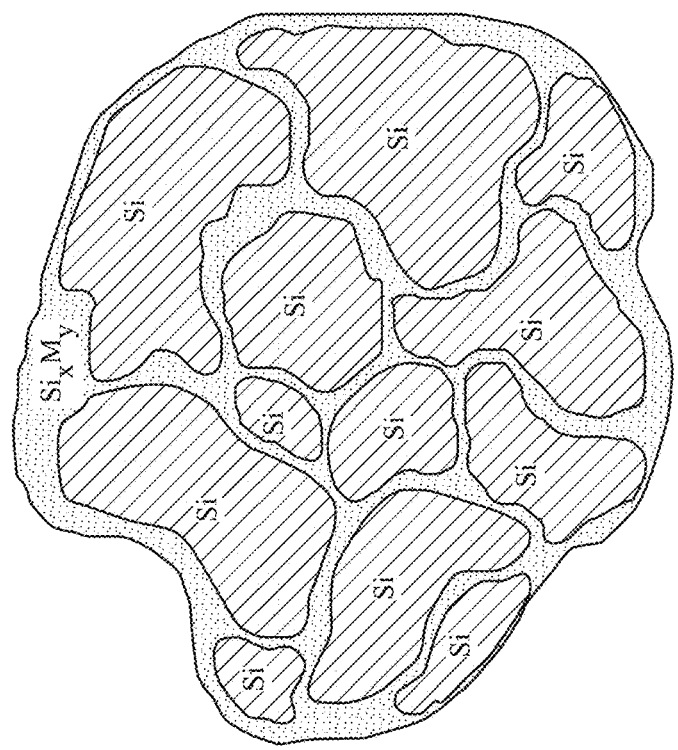
FIG. 1 is a schematic of an exemplary process of forming an electrochemically active material according to some aspects as provided herein.
Figure 1:
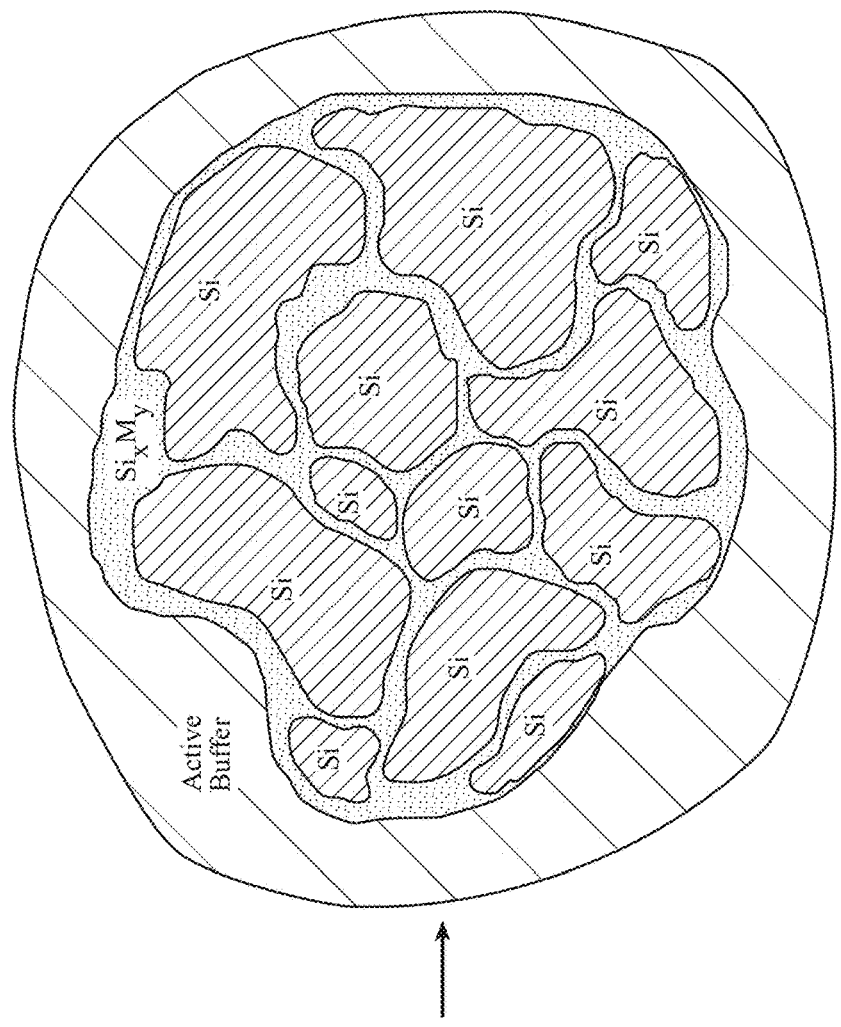

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art It will be understood that, although the terms "first," "second," "third" etc. may be used herein to describe various elements, components, regions, layers, and/or sections, these elements, components, regions, layers, and/or sections should not be limited by these terms.

These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein the term "electrochemically active" is defined as capable of reversibly absorbing an ion, optionally a lithium ion.

As defined herein, an "anode" includes a material that acts as an electron acceptor during charge.

As defined herein, a "cathode" includes a material that acts as an electron donor during charge.

Provided are electrochemically active materials that possess excellent cycle life and capacity when incorporated into a secondary battery. The materials capitalize on a silicon based core with particularly tailored structure(s) and compositions where the core includes, optionally solely includes, one or more, optionally a plurality of, silicon particulates of a particle size of less than 1 micrometer, the particulates intermixed with and surrounded by a silicon metal alloy composite. Si-metal alloy composite is designed to stabilize Si structure of the particles by limiting the formation high Li-content $Li_xSi$. The metal alloy (a) limits surface Si volume change and (b) keeps the large volume change within the Si core structure. The polyparticulate core is enveloped partially or fully by a buffering shell layer that optionally serves as: (1) an active material itself; (2) a conductive network; and/or (3) a buffering matrix to accommodate volume change as a $2^{nd}$ protective layer. The resulting materials are formed by simple processes that are easily scaled and economical.

The starting materials for formation of the core may be industrial grade silicon (e.g. ≥98% pure or other industrial feedstock but may also be formed from solar or electronic grade materials as are recognized in the art) such as micron-size silicon, silicon oxide or silica, and micron-size metal powders. In some aspects, a silicon precursor is a porous Si described in Patent Application No: PCT/US2016/041619. Other methods such as HF etching and metal assisted etching processes may optionally be used to form the core particles.

The silicon precursor materials may be porous. In some aspects, the porosity is 10% to 90% or any value or range therebetween, optionally 20% to 80%, optionally 30% to 60%, optionally at or about 50%. Optionally the pores of the core particles have an average pore size (e.g. cross sectional dimension) of at or about 10 nm to at or about 500 nm, optionally at or about 100 nm to at or about 200 nm, optionally at or about 150 nm.

The silicon precursor particulates are optionally tailored for a desired Brunauer-Emmett-Teller (BET) surface area. A BET surface area is optionally 10 m$^2$/g to 500 m$^2$/g or any value or range therebetween, optionally 20 m$^2$/g to 200 m$^2$/g, optionally 20 m$^2$/g to 100 m$^2$/g.

The silicon precursor may be in any physical form such as a particulate (e.g. powder). Illustrative examples of particulate powders are those with the particulates in the shape of a nanowire, sheet, nanotube, nanofiber, porous structure, whisker, nanoplatelet, sphere or spheroid, or other configuration known in the art.

An exemplary process of forming an electrochemically active material as described herein is illustrated in the schematic of FIG. 1. The overall active material may be formed by a two-step, process optionally using ball milling. In the first step, a core is formed whereby the silicon precursor particulates are intermixed with one or more metals to form a composite with the metal Si particulates are surrounded by a silicon metal alloy composite material. The core may be formed by a high energy ball milling process where a desired amount of the silicon material is combined with a desired metal and milled. A suitable metal useful for the formation of the core and to form the alloy with the silicon may be Fe, Pb, Mg, Mn, Al, Ag, Au, Ti, Pt, Pd, Ru, Cu, Ni, Ro, or alloys thereof. The result of the high energy ball milling is a plurality of silicon particles intermixed with and surrounded by a silicon metal alloy composite material that limits volume changes of the silicon particles isolating such changes to the interparticle space and which is accommodated by the porous structure of the particles.

In the formation of the core, the powders of the silicon particulates and the metal are optionally loaded into a reaction chamber at a desired mass ratio. A mass ratio is optionally a stoichiometric mass ratio. A mass ratio is optionally from 5 weight percent to 85 weight percent silicon to 1 weight percent to 50 weight percent metal. Optionally, a mass ratio of Si to metal is from 2:1 to 7:1 or any value or range therebetween. Optionally, the mass ratio of Si to metal is about 2:1, 3:1, 4:1, 5:1, 6:1 or 7:1. A reaction chamber is optionally any container suitable for high energy milling, thermal treating, or other, and optionally sealable from the external environment. An illustrative example of a reaction chamber is a stainless steel or ceramic jar. Included in the reaction chamber is milling media optionally formed of the same material as the reaction chamber. In some aspects, the milling media is or includes stainless steel or ceramic milling balls optionally ½ inch in diameter. A high energy planetary ball mill (e.g. Retsch PM400) may be used to perform the mechanical milling reactions.

Mechanical milling is optionally achieved by ball milling, optionally high energy ball milling. A ball to powder (e.g. Si and metal powders) mass ratio (BPR) may be 41 or greater, optionally 5:1, optionally 6:1, optionally 7:1, optionally 8:1, optionally 9:1, optionally 10:1, optionally 11:1, optionally 12:1, optionally 13:1, optionally 14:1, optionally 15:1, optionally 16:1, optionally 50:1, or greater. In sonic aspects, the BPR is 5:1 to 50:1, or greater. In some aspects, the BPR is 10:1.

Mechanical milling is performed for a milling reaction time. A milling reaction time is optionally from 0.2 hours to 50 hours, or any value or range therebetween, optionally 0.2 hours to 20 hours, optionally 0.2 hours to 10 hours, optionally 20 hours.

Milling is optionally performed under a non-reactive atmosphere such as an inert gas, a reducing atmosphere, or air. Nonreactive atmospheres are known in the art, illustratively argon, xenon, or others. Adjustable mechanical milling parameters include rotational speed (or cycles/min), ball:powder mass ratio (BPR), bail size, reactant mass ratio. In sonic aspects, the mechanical milling may be performed at the following conditions, 400 revolutions per minute, with 10:1 BPR, ½ inch diameter stainless steel balls and a 3:1 mass ratio. The revolutions per minute or number of cycles per minute can vary between 100 and 2000; ball to powder ratios can fluctuate from 2:1 to 100:1; different media size from 1 to 20 mm can be used as well as other materials such as hardened steel, zirconia, etc.

The resulting core material therefore includes or consists of a group of silicon particulates intermixed with or surrounded by silicon-metal alloy composite(s). Within the core the Si particulates have an average particle size (e.g., an average maximum linear dimension, optionally diameter) of less than one (1) micrometer (micron), optionally 0.01 to 1 micron or any value or range therebetween, optionally 0.1 to 1 micron. The particle size can be measured from a cross-section of the particles by a Scanning Electron Microscope (SEM).

In step 2 as illustrated in FIG. 1, the resulting core material is then encapsulated, optionally fully encapsulated, optionally partially encapsulated, in a buffering shell layer. A buffering shell layer is optionally formed of an electrochemically active material, optionally that differs in composition from a core material. The encapsulation step is optionally performed by ball milling. The process and milling parameters serve to maintain the structure of the core material while grinding up the active shell layer material so as to encapsulate the core particles. In some aspects, a shell layer optionally includes a carbon containing material, optionally graphite. In some aspects, a shell layer includes or is exclusively formed of a carbon, optionally natural graphite, graphene, artificial graphite, expanded graphite, carbon fibers, hard carbon, carbon black, carbon nanotubes, fullerenes, activated carbon, or combinations thereof.

For encapsulation, the resulting core materials are intermixed with a shell material by ball milling. Optionally, the particles are loaded into a reaction chamber at a desired mass ratio. Optionally, a mass ratio of core particles to shell material powder is from 9:1 to 1:9 or any value or range therebetween. Optionally, the mass ratio of core powder to shell powder is about 85:15. Optionally, the mass ratio of core powder to shell powder is about 1:1. The powders are combined in a reaction chamber suitable for ball milling and optionally sealable from the external environment. An illustrative example of a reaction chamber is a stainless steel or ceramic jar. Included in the reaction chamber is milling media optionally formed of the same material as the reaction chamber. In some aspects, the milling media is or includes stainless steel or ceramic milling balls optionally ½ inch in diameter. A high energy planetary ball mill (e.g. Retsch PM400) may be used to perform the mechanical milling reactions, but used at lower milling energy such as at a rotational speed of at or less than 200 rpm.

A ball to powder (e.g. core and shell material powders combined) mass ratio (BPR) may be 2:1 or greater, optionally 3:1, optionally 4:1, optionally 5:1, optionally 6:1, optionally 7:1, optionally 8:1, optionally 9:1, optionally 10:1, optionally 11:1, optionally 12:1, optionally 13:1, optionally 14:1, optionally 15:1, optionally 16:1, optionally 50:1, or greater. In some aspects, the BPR is 5:1 to 50:1, or greater. In some aspects, the BPR is 5:1.

Mechanical milling is performed for a milling reaction time. A milling reaction time is optionally from 0.2 hours to 50 hours, or any value or range therebetween, optionally 0.2 hours to 20 hours, optionally 0.2 hours to 10 hours, optionally 4 hours.

Milling is optionally performed under a nonreactive atmosphere such as an inert gas, a reducing atmosphere, or air. Non-reactive atmospheres are known in the art, illustratively argon, xenon, or others. Adjustable mechanical milling parameters include rotational speed (or cycles/min), ball powder mass ratio (BPR), ball size, reactant mass ratio. In some aspects, the mechanical milling may be performed at the following conditions: 200 revolutions per minute; with 5:1 BPR; ½ inch diameter stainless steel balls; and a 1:1 mass ratio of core to shell material powders.

The inclusion of the relatively small core particulates allows for efficient encapsulation and relatively larger overall active material particles. The resulting active material particles are optionally sized or are otherwise produced to have a maximum linear dimension (D50 size) greater than one micron, optionally from 1 micron to 100 microns or any value or range therebetween. In some aspects, a final active material particle size (D50) is from 5 microns to 50 microns. The particle sizes can be measured by using a high resolution digital laser particle size analyzer. Particle sizes below are presented as D50 by this method unless otherwise specified.

The resulting active materials have a tap density, optionally of 1.2 or less. In some aspects, a tap density is 0.1 to 1.2 or any value or range therebetween, optionally 0.4 to 0.9. Optionally a tap density is at or less than 1.2, 1.1, 1.0, 0.9, 0.8, 0.7, 0.6, 0.5, 0.4, 0.3, 0.2 or 0.1.

The electrochemically active particles are optionally used as an active material alone or in combination with one or more other active materials in the formation of an anode for use in a primary or secondary battery.

The electrochemically active particles may or may not be associated with an electrically conductive substrate. When associated with a substrate, the substrate is optionally formed of any suitable electronically conductive and impermeable or substantially impermeable material, including, but not limited to, copper, stainless steel, titanium, or carbon papers/films, a non-perforated metal foil, cladding material including nickel and aluminum, cladding material including copper and aluminum, nickel plated steel, nickel plated copper, nickel plated aluminum, gold, silver, any other suitable electronically conductive and impermeable material or any suitable combination thereof. In some aspects, substrates may be formed of one or more suitable metals or combination of metals (e.g., alloys, solid solutions, plated metals). Optionally, an active material is not associated with a substrate.

The electrochemically active particles may be associated with a binder. A binder material is optionally used at 1-10% by weight of solvent and combined with the electrochemically active particles. A binder material optionally includes common Si anode binders such as carboxymethyl cellulose (CMC), styrene-butadiene rubber (SBR), polyacrylic acid (PAA), or polyvinyl alcohol (PVA) binders. Other illustrative binder materials include SBR/CMC blends and polyacrylic acid (PAA). In some aspects a PVdF binder in NMP, latex PVdF, or aqueous polyolefin latex suspensions may be used. Examples of the solvent used in preparation of the electrode may include, but are not limited to aqueous, carbonate-based, ester-based, ether-based, ketone-based, alcohol-based, or aprotic solvents. Specific solvents such as dimethyl sulfoxide (DMSO), N-methyl pyrrolidone (NMP) and ethylene glycol, and distilled water may be used. The resulting slurry may be applied to the substrate followed by standard techniques including casting, drying, and optionally pressing. The substrate is optionally electrically associated with an electrode tab in order to electrically connect the electrode to the appropriate terminal of a battery (i.e., negative electrode to negative terminal and positive electrode to positive terminal). The electrode tab may be welded by a method of welding that includes, but is not limited to, resistance welding, laser welding, electron beam welding, or ultrasonic welding.

An electrochemical cell typically includes a separator positioned between the electrodes. A separator is optionally a non-woven, felted, nylon, or polypropylene material that is permeable to ions, optionally lithium ions, and may be suitably saturated with electrolyte.

An electrochemical cell includes an electrolyte that contacts the anode, the cathode and the separator. The electrolyte may include an organic solvent and a lithium salt. The organic solvent may be a linear or cyclic carbonate. Illustrative examples of organic solvents include but are not limited to ethylene carbonate, propylene carbonate, butylene carbonate, trifluoropropylene carbonate, y-butyrolactone, sulfolane, 1,2 diethoxyethane, tetrahydrofuran, 3-methyl-1, 3-dioxolane, methyl acetate, ethyl acetate, methylpropionate, ethylpropionate, dimethyl carbonate, diethyl carbonate, ethyl methyl carbonate, dipropyl carbonate, methylpropyl carbonate, or any combination thereof. Optionally, the electrolyte is a polymer electrolyte.

Illustrative lithium salts include $LiPF_6$, $LiBF_4$, $LiAsF_6$, $LiClO_4$, $LiCF_3SO_3$, $Li(CF_3SO_2)_2N$, $LiN(SO_2C_2F_5)_2$, $LiSbF_6$, $LiC(CF_3SO_2)_3$, $LiC_4F_9SO_3$, and $LiAlCl_4$. The lithium salt may be dissolved in the organic solvent. Optionally, two or more of the foregoing exemplary lithium salts may be used. The concentration of the lithium salt is optionally 0.1 to 2.0 M in the electrolyte.

An anode, cathode, electrolyte, and separator may be housed in a casing as is typically known in the art to form an enclosed or substantially enclosed electrochemical cell. The electrochemical cell may have any suitable configuration or shape, and may be a coin cell, pouch cell, cylindrical or prismatic cell.

An electrochemically active material including the electrochemically active particles as provided herein alone or in combination with another active, optionally a carbon active, shows improved cycle life and similar initial capacity loss (ICL) relative to other silicon electrochemically active materials when used in an electrochemical cell. An anode including the electrochemically active particles optionally has a cycle life in a secondary cell of greater than 80% residual capacity at cycle 40, cycle 45, cycle 50, cycle 55, cycle 60, cycle 65, cycle 70, cycle 75, cycle 80, cycle 85, cycle 90, cycle 95, cycle 100, cycle 125, cycle 150, cycle 200, cycle 250, cycle 300, cycle 350, cycle 400, cycle 450, or greater. Prior materials measured under the same conditions show significantly lower cycle life as defined as the cycle which the capacity drops below 80% residual capacity. Improved cycle life can be achieved by designing cells with anodes that exhibit relatively lower specific capacity. For example, when a cell employs an anode of a specific capacity of less 500 mAh/g to 600 mAh/g, the cell can cycle in excess of 400 cycles before 80% initial capacity is reached. A cell with between 650 and 750 mAh/g anodes can readily cycle in excess of 200 cycles before 80% intimal capacity is reached.

In some aspects the electrochemically active materials as provided herein have exceptionally low initial capacity loss (ICL). As such, the ICL of an electrochemically active material as provided herein is optionally from 5% to 35%, optionally less than 30%, optionally less than 25%, optionally less than 20%, optionally less than 10%.

Various aspects of the present disclosure are illustrated by the following non-limiting examples. The examples are for illustrative purposes and are not a limitation on any practice of the present invention. It will be understood that variations and modifications can be made without departing from the spirit and scope of the disclosure.

EXAMPLES

Si precursors can be inexpensive commercially available micron size silicon power (325 mesh, 99% trace metal basis, Product# 215619 ALDRICH), In some aspects Si precursors can be porous Si. Illustrative porous Si particles are formed using inexpensive commercially available micron size silica ($SiO_2$) powder (Grace Davison PERKASIL Silica). The silica powder is pre-mixed (FlackTek Speed mixer, 2000rpm for 2 rains three times) with aluminum powder (mesh 325, 99.97% Al, Alfa Aesar) and transferred to a hardened steel jar along with milling media of the same composition. The jar is filled with argon and sealed before mechanical milling. High-energy ball milling (stoichiometric mass ratio of reactants, 4:1 ball to powder ratio, milled for 4 h hours using SPEX 8000, 1200-1500 cycles per minute) is used to activate the powder systems and partially reduce the silica as milling proceeds (t>0.5 h). After mechanical milling, the powder mixture is transferred to a tube furnace for thermal reduction. Thermal reduction is performed over a range of temperatures from 500° C. to 700° C. under argon atmosphere. The resulting $Si/Al_2O_3$ powder mixtures are then treated with an etchant optionally including an acid (e.g. HCl, $H_2SO_4$) that removes the alumina leaving Si panicles with a porous structure.

The regular (not further processed to increase porosity) silicon powder or the porous silicon powder as provided above is then combined with a metal to form Si/Si-alloy core particles. The reactants are combined at 3 parts silicon powder to 1 part iron (by weight) (and in other experiments a ratio of 2:1 or 4:1) in a Retsch PM400 planetary ball mill using stainless steel balls and in a sealed stainless steel container. The materials are mixed at a rotational speed of >200 revolutions per minute (rpm) for a milling time of >2 hours in an air atmosphere.

Figure 2A:
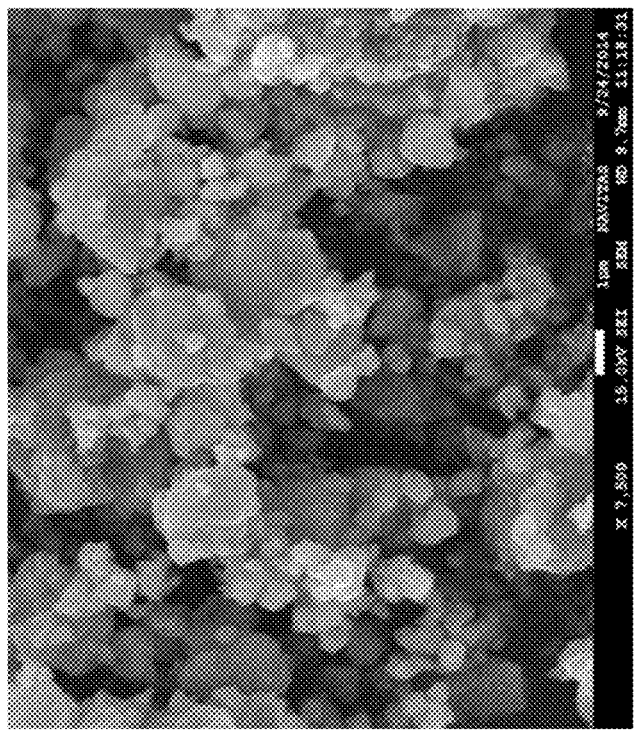
FIG. 2A illustrates a plurality of exemplary core particles that include Si encapsulated in SiFe alloy as observed by scanning electron microscopy.
Figure 2B:
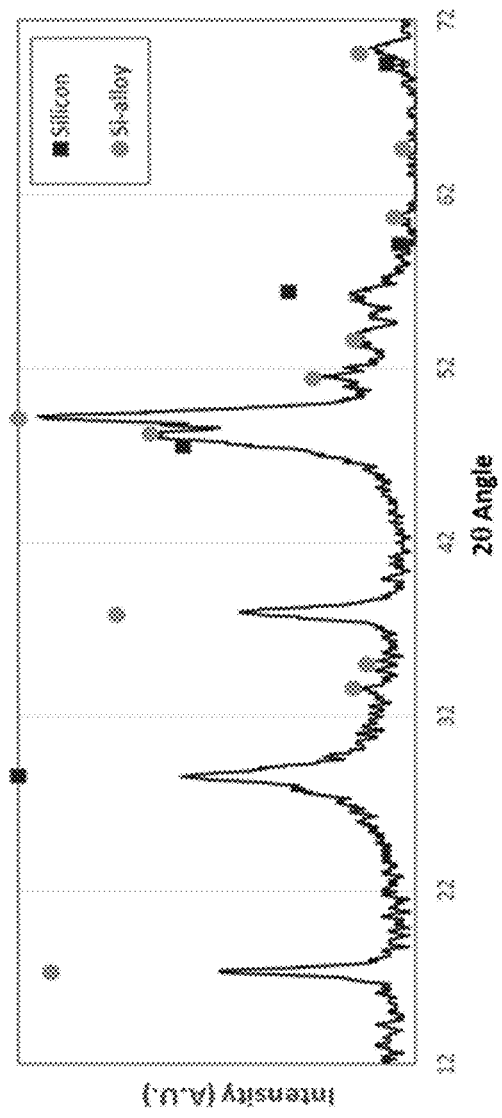
FIG. 2B illustrates MUD results demonstrating the presence of both Si and SiFe alloys in the core.
Figure 3:
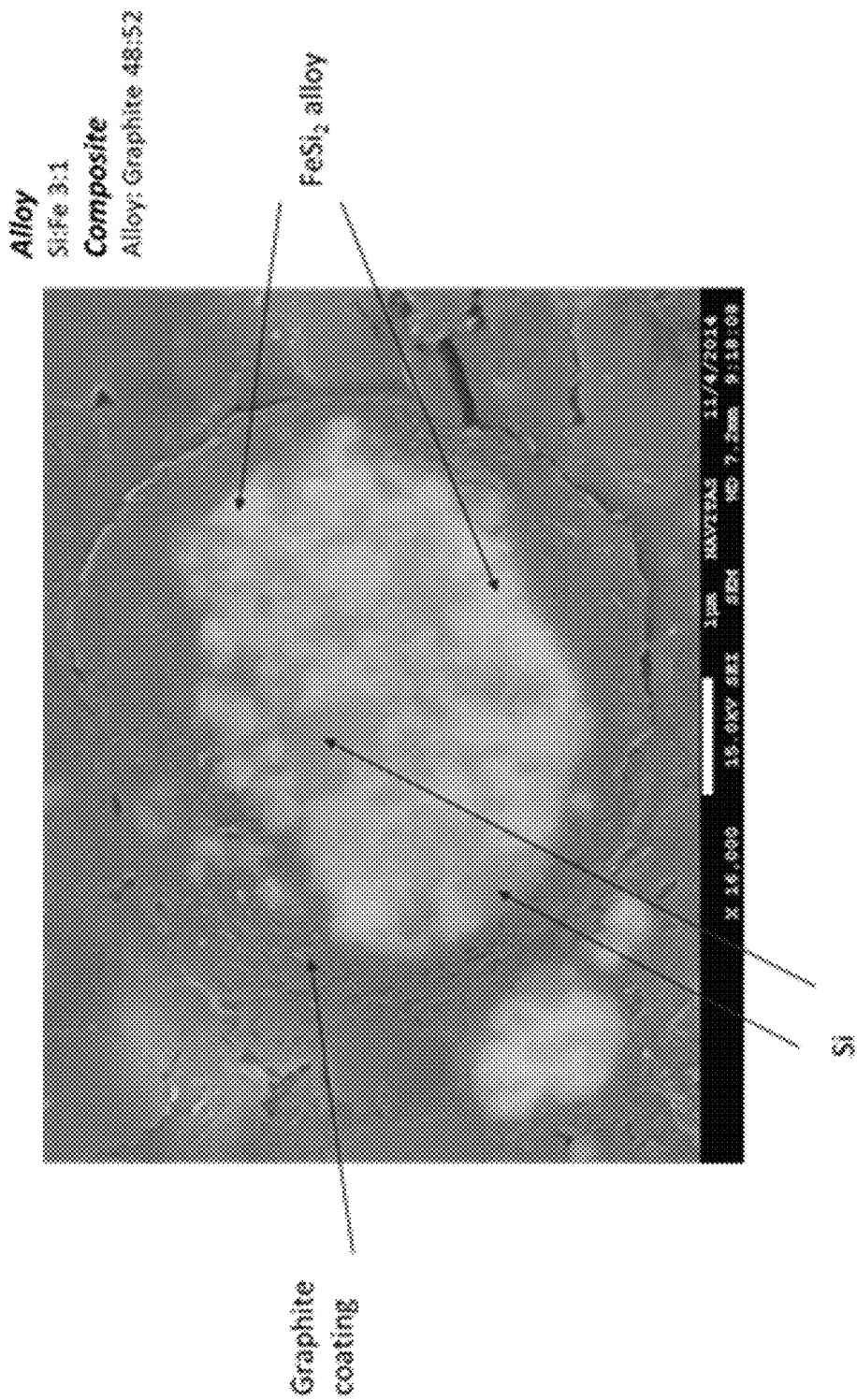
FIG. 3 illustrates active material particles with a Si/SiFe core surrounded by a graphite coating.
Figure 4A:
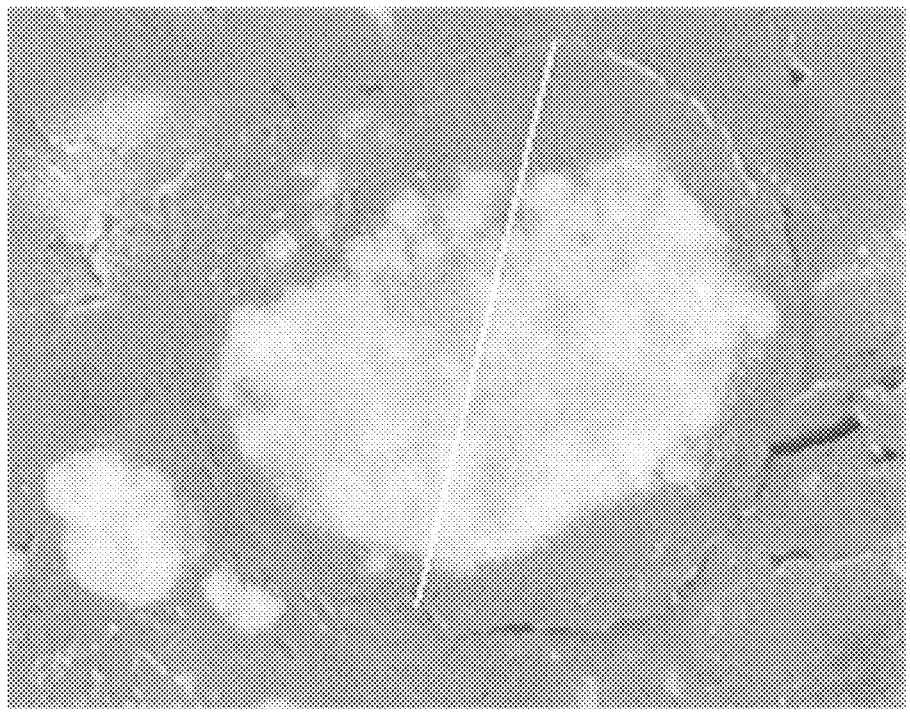
FIG. 4A illustrates active material particles with a Si/SiFe core surrounded by a graphite coating with a particle size illustrated by the white line of greater than one micrometer.
Figure 4B:
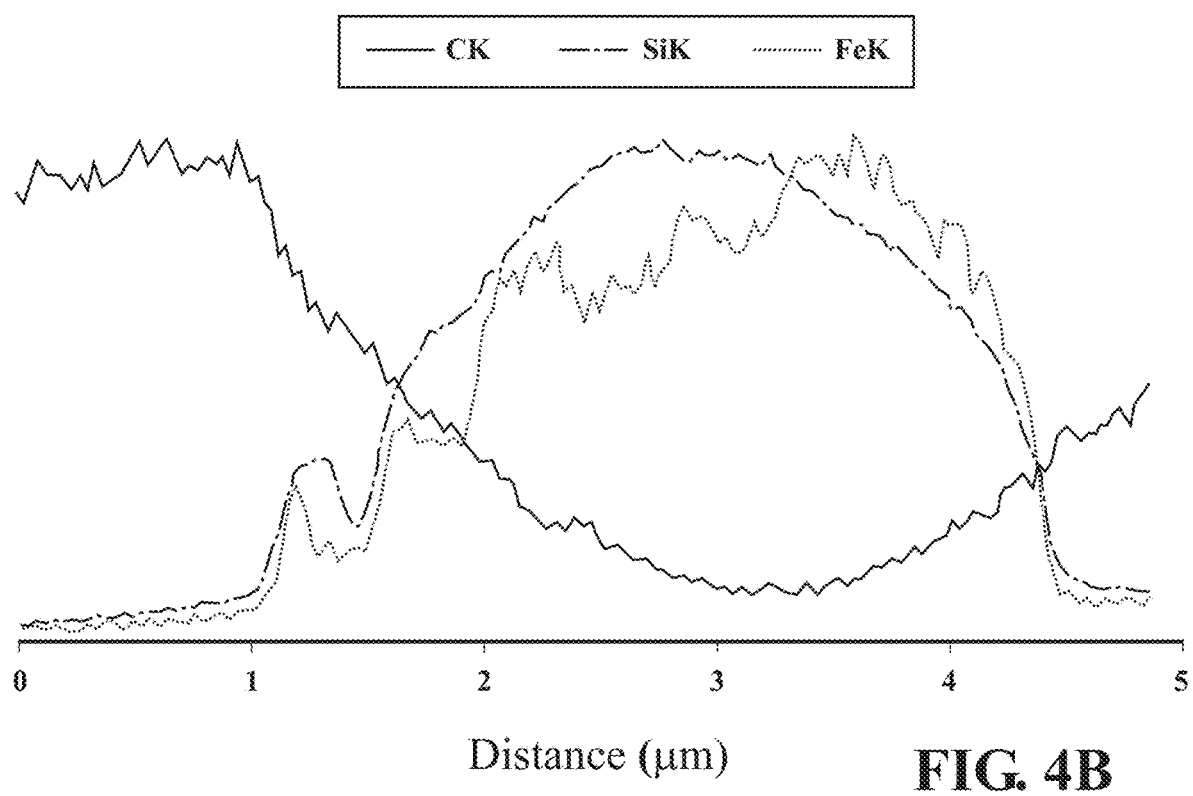
FIG. 4B illustrates an elemental mapping profile of the particles represented by FIG. 4A illustrating the presence of Si, SiFe alloy, and graphite.

The core particles are analyzed by a scanning electron microscope (SEM) equipped with energy disperse X-ray spectroscopy (EDS) system. FIG. 2A illustrates a plurality of core Si particles with a primary particle size of less than one micrometer as illustrated by SEM. FIG. 2B illustrates an XRD pattern confirming the presence of both a silicon material and a silicon-iron alloy, The resulting core particles are then encapsulated with a buffering shell layer that includes carbon. The reactants are included at 1 part core particle powder to 1 part graphite (by weight) (either natural or artificial graphite). For these experiments natural graphite from Nippon Carbon Co., AZB series, tap density 1.01g/cm³, BET surface area 2.71 m²/g, $D_{50}$ particle size of 14.2 microns, is used. The materials are combined in a Retsch PM400 planetary ball mill using stainless steel balls and in a sealed stainless steel container. The resulting encapsulated particles are studied as above. Representative SEM and elemental mapping profiles are illustrated in FIG. 3 and FIG. 4A demonstrating a core formed of particles of Si intermixed with Si/Fe alloy whereby the core is coated with graphite.

Active material particle properties of various formulations are as illustrated in Table 1 where BET surface area was measured with Micromeritics ASAP 2020 and tap density was measured with Quantachrome Autotap.

TABLE 1

| Property | Metrics |
| --- | --- |
| Particle size (D50, μm) | 7 |
| BET surface area (m²/g) | 20 |
| Tap density (g/cm³) | 0.9 |

Electrochemical properties of the final electrochemically active particles are evaluated in half coin cells, single-layer-pouch (SLP) cells and large format pouch cells. Anodes are hand casted onto 10 μm thick copper foil. Various binders are used including PVdF, CMC/SBR, or LiPAA, For half-cell studies, water based binders are used at a mass ratio of 92/1.5/6.5 for active/conductive (Denka black carbon)/binder material respectively. Slurries had a viscosity between 1000 to 3000 cPs, a solid content >25%, and the slurry formulation was controlled to have the active content >90%.

Figure 5A:
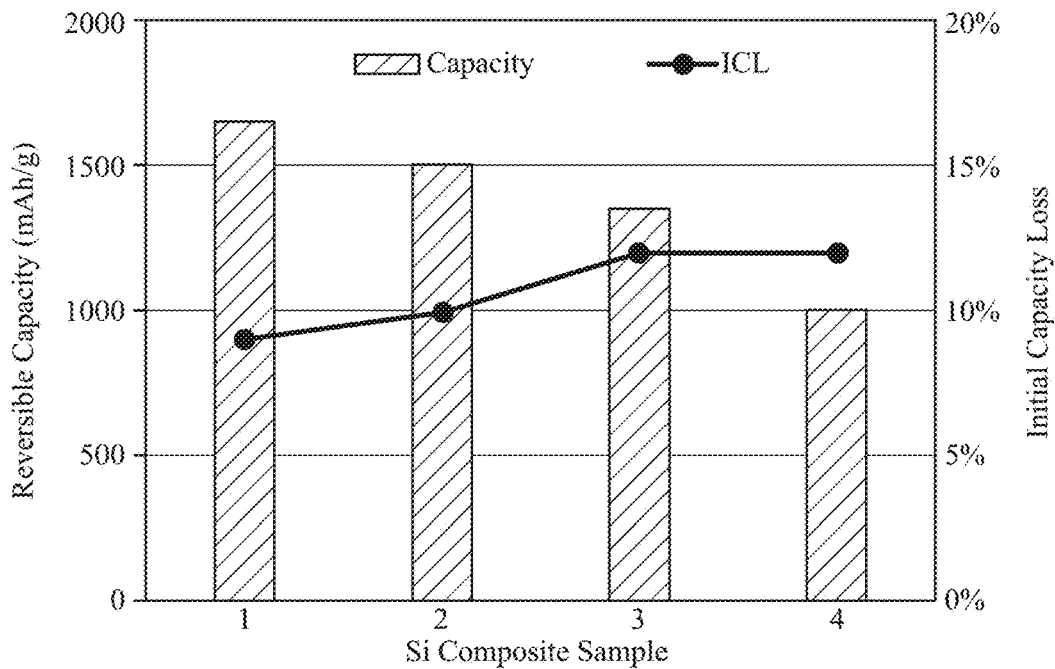
FIG. 5A illustrates specific capacity and initial capacity loss (ICL) of active material particles according to some aspects.
Figure 5B:
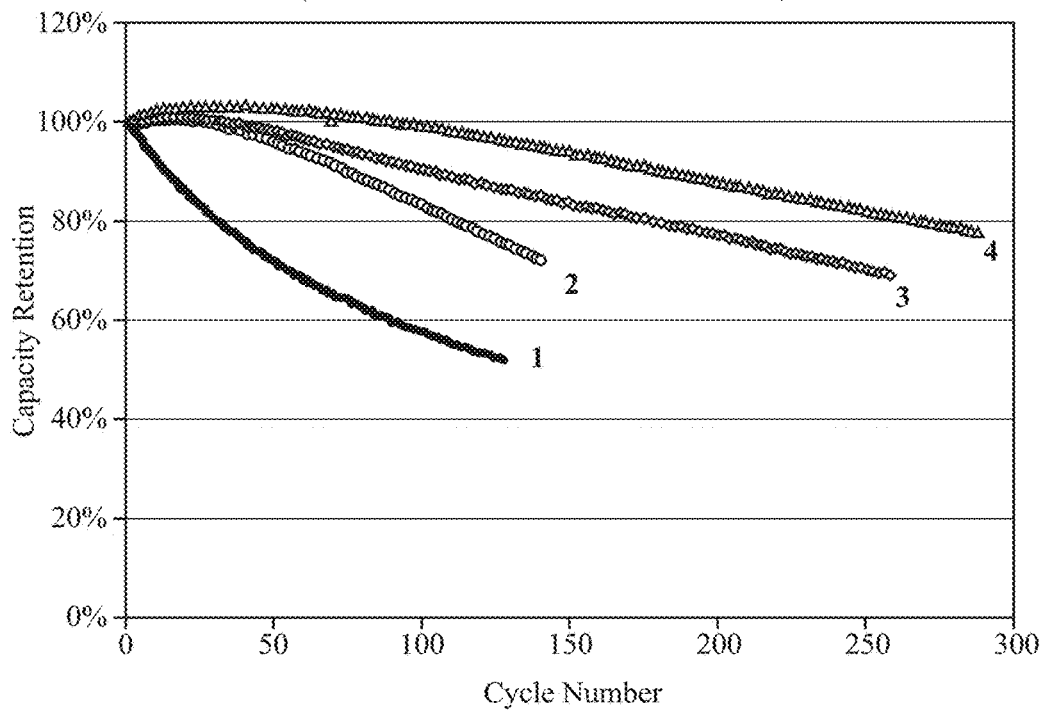
FIG. 5B illustrates cycle life of active materials with various contents of silicon according to some aspects.
Figure 6:
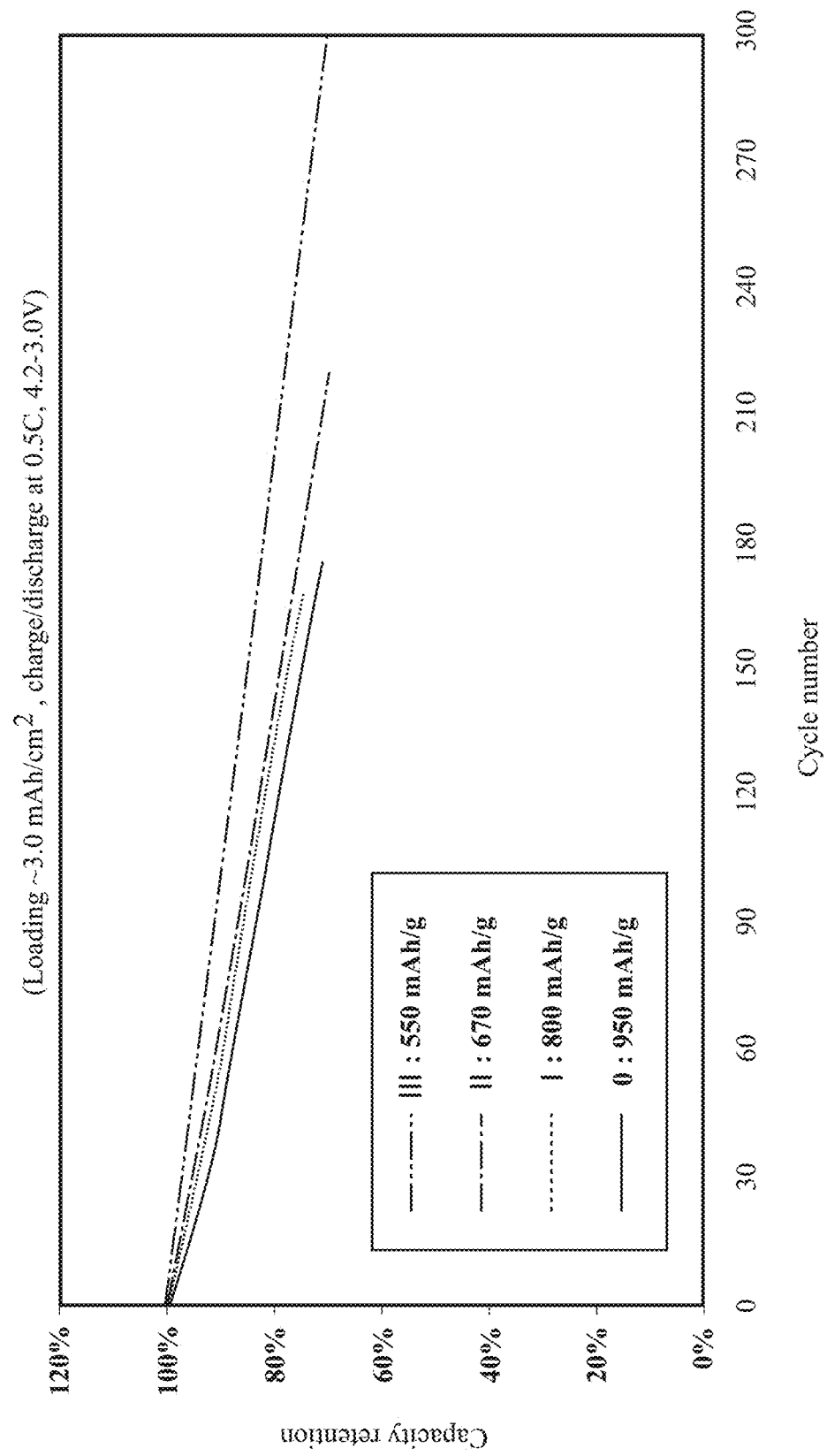
FIG. 6 illustrates cycle life of active materials with various loadings of graphite according to some aspects.
Figure 7:
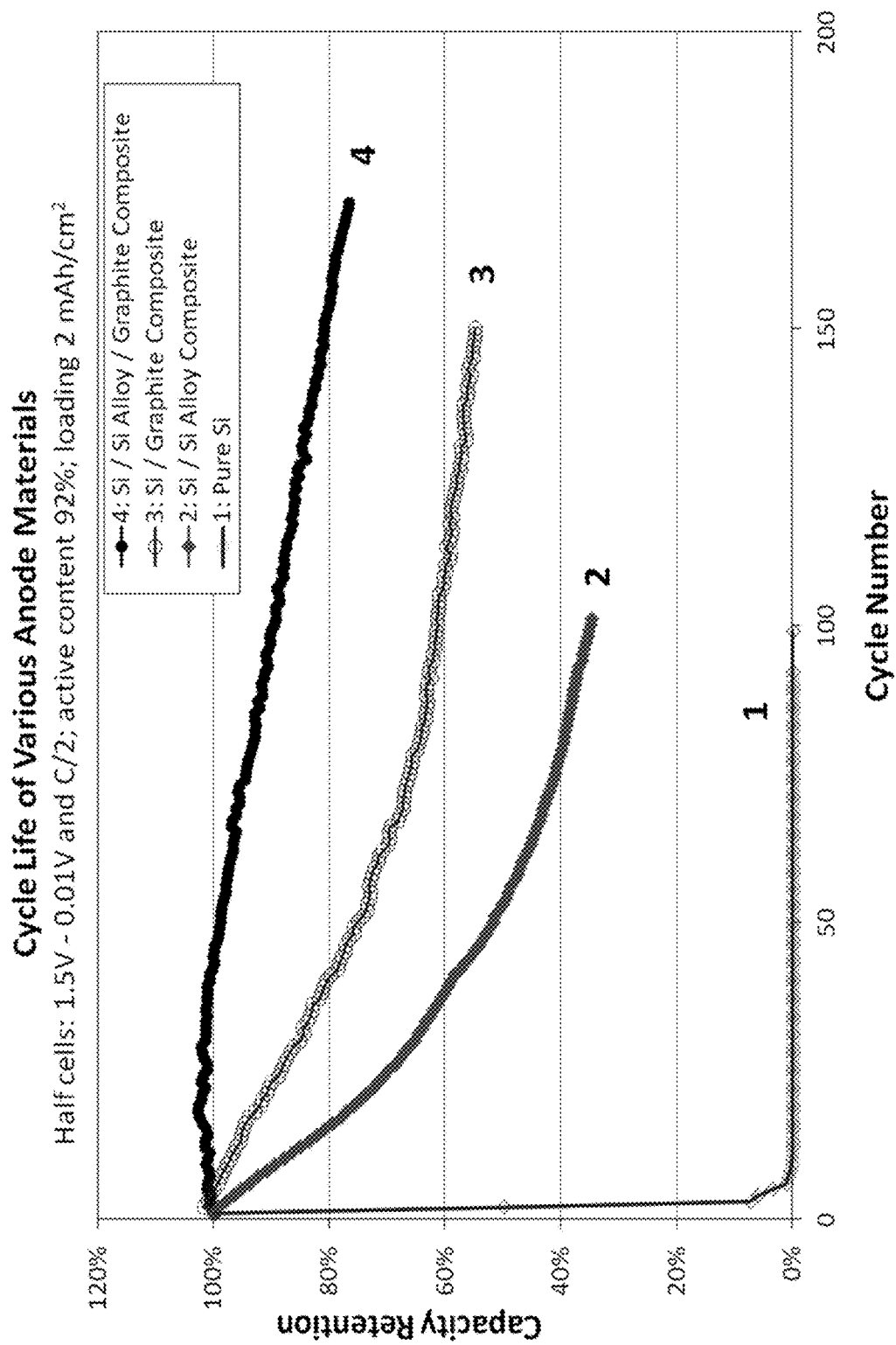
FIG. 7 illustrates cycle life for materials as provided herein at various stages of manufacture and compares it to more traditional materials illustrating significantly improved cycle life of the materials according to some aspects as provided herein.

The materials were tested in CR2025 half cells against a Li metal counter electrode or in SLP cells versus an cathode of NiCoMn 523 (93 wt %), 3 wt % carbon black, 4 wt % binder (PVdF) with a porosity of 30%. The half-cell formation is carried out at −0.05C/0.05C current rate (lithiation/delitiation) from 10 mV to 1.5 V. Rate capability is performed in both half-cell and pouch cell formats with an operation voltage of 0.01-1.0 V. rate studies cells are lithiated at 0.1 C and delithiated at 0.1, 0.2, 0.5, 1.0, 2.0 and 5.0 C. Cycling experiments are run in using the half-cells at −0.5C/0.5C current rate (lithiation/delitiation) from 10 mV to 1.0 V with a coating amount of 2 mAh/cm². Results are illustrated in FIG. 5A and FIG. 6. By adjusting the Si to Fe ratio and Si to carbon ratio to lower amounts of Si in the composite, the Si anode material will have lower capacity and slightly higher ICL. FIG. 5A shows the anode capacity ranges from 1650 mAh/g to 1000 mAh/g and ICL from 9% to 12%. FIG. 5B indicates that anode cycle life increases with decreasing capacity in half cell test. FIG. 6 shows the same trend of cycle life vs. capacity in Li ion full cell test. The above materials formed at various stages were compared in half cell configuration as described above. Either pure Si (1), the Si and SiFe alloy composite core material (2), pure Si coated with graphite (3), or the final product Si and SiFe alloy composite core coated with graphite (4) are compared with results illustrated in FIG. 7. As can be observed far superior performance is achieved by with just the core particles as provided herein which is significantly further improved by coating the core particles with an electrochemically active buffering shell layer.

Figure 8:
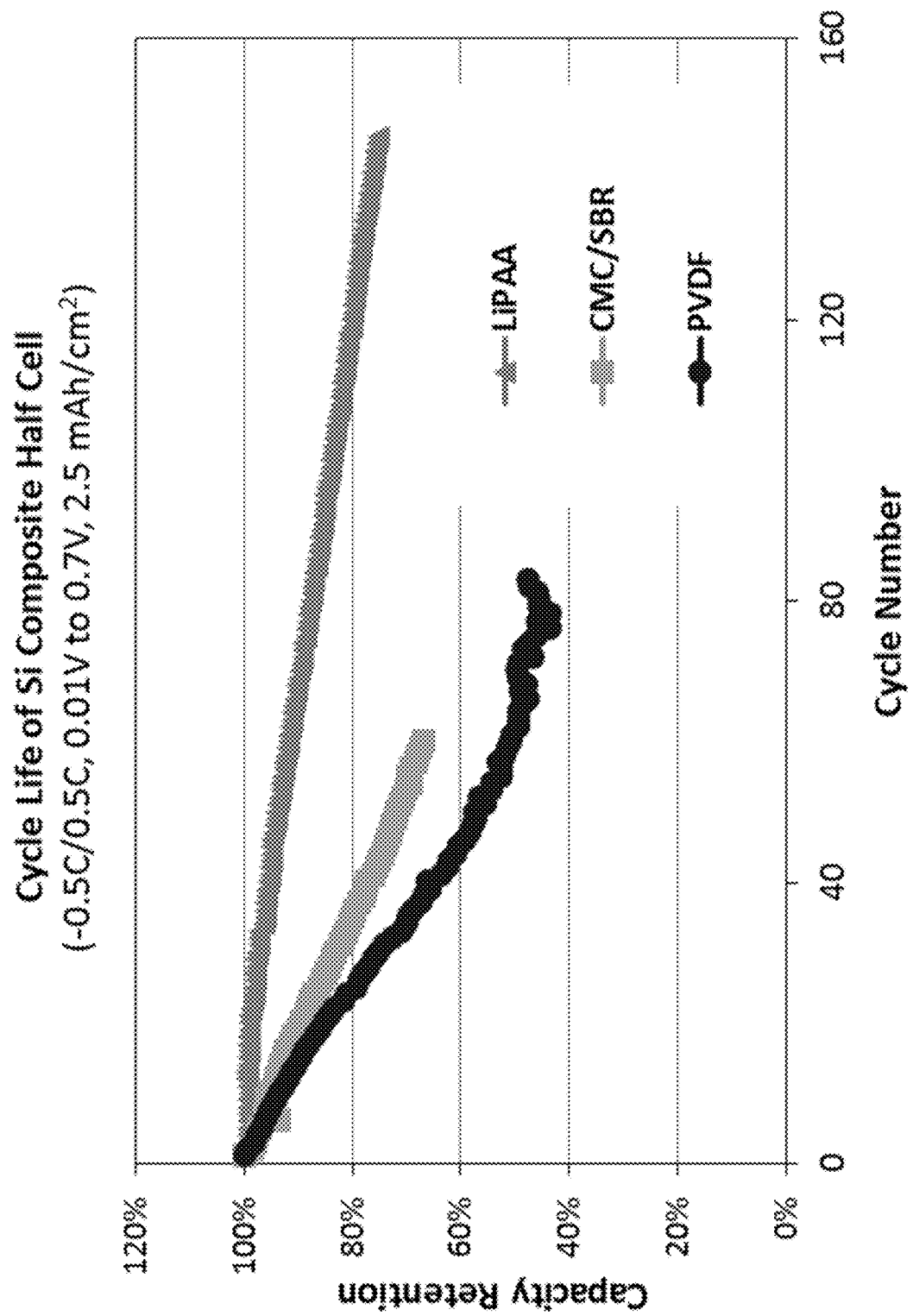
FIG. 8 illustrates half-cell performance when various binders are used in anode formation.

Binder selection also affected overall performance of cells employing anodes with the electrochemically active materials as provided herein. The above half cells were formed with PVdF, CMC/SBR and LiPAA binders are traditional for Si materials. PVDF binder was used as a baseline. The anode active material was high energy Si composite with 950 mAh/g capacity and all the conditions were the same except types of binders. The LiPAA showed much better cycle life than CMC/SBR for Navitas Si composite system (FIG. 8). It is likely due to the strong interaction between PAA carboxyl groups and Si alloy composite.

Figures 9A, 9B:
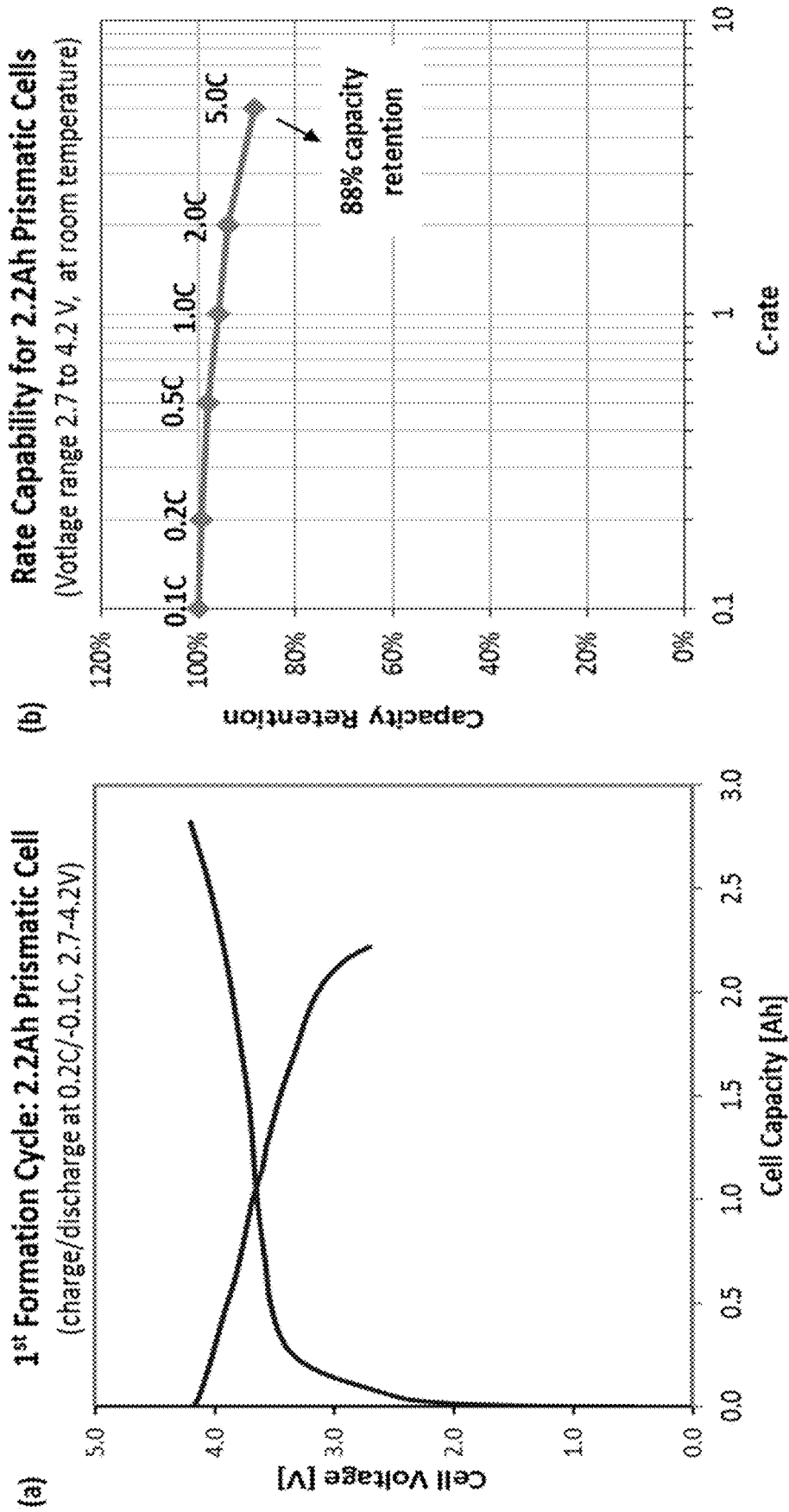
FIG. 9A illustrates first formation cycle of a large format prismatic cell employing an anode including an electrically active material according to an aspect as provided herein.
FIG. 9B illustrates rate capability of a large format prismatic cell employing an anode including an electrically active material according to an aspect as provided herein

Further improved results were observed in large format cells. Prismatic cells with 6.0×12.5 cm dimensions and >2 Ah were assembled in the dry room. Electrodes were stamped, stacked and welded using semi-automated assembly and standard operating procedures to assure reproducibility. The NCM 523 cathode was used to capacity match the Si composite anode formed identically as above, but in larger format. The electrochemical loading of the cathode electrodes was set to 3.0 mAh/cm$^2$, which give a cell reversible capacity of 2.2 Ah. FIG. 9A shows the voltage-capacity plot for the first formation cycle of the cell. FIG. 9B shows rate capability. At 5.0 C rate the cell still shows 88% capacity retention, indicating a very low resistive cell.

The rate capability and cycle life were also compared with the above SLP cells. The prismatic cells showed slightly better performance relative to the SLP cell demonstrating the provided electrochemically active materials are robust and useful in the PHEV 10 year life simulated test as this large format cell type is recognized to reliably project larger cell performance.

Figure 10:
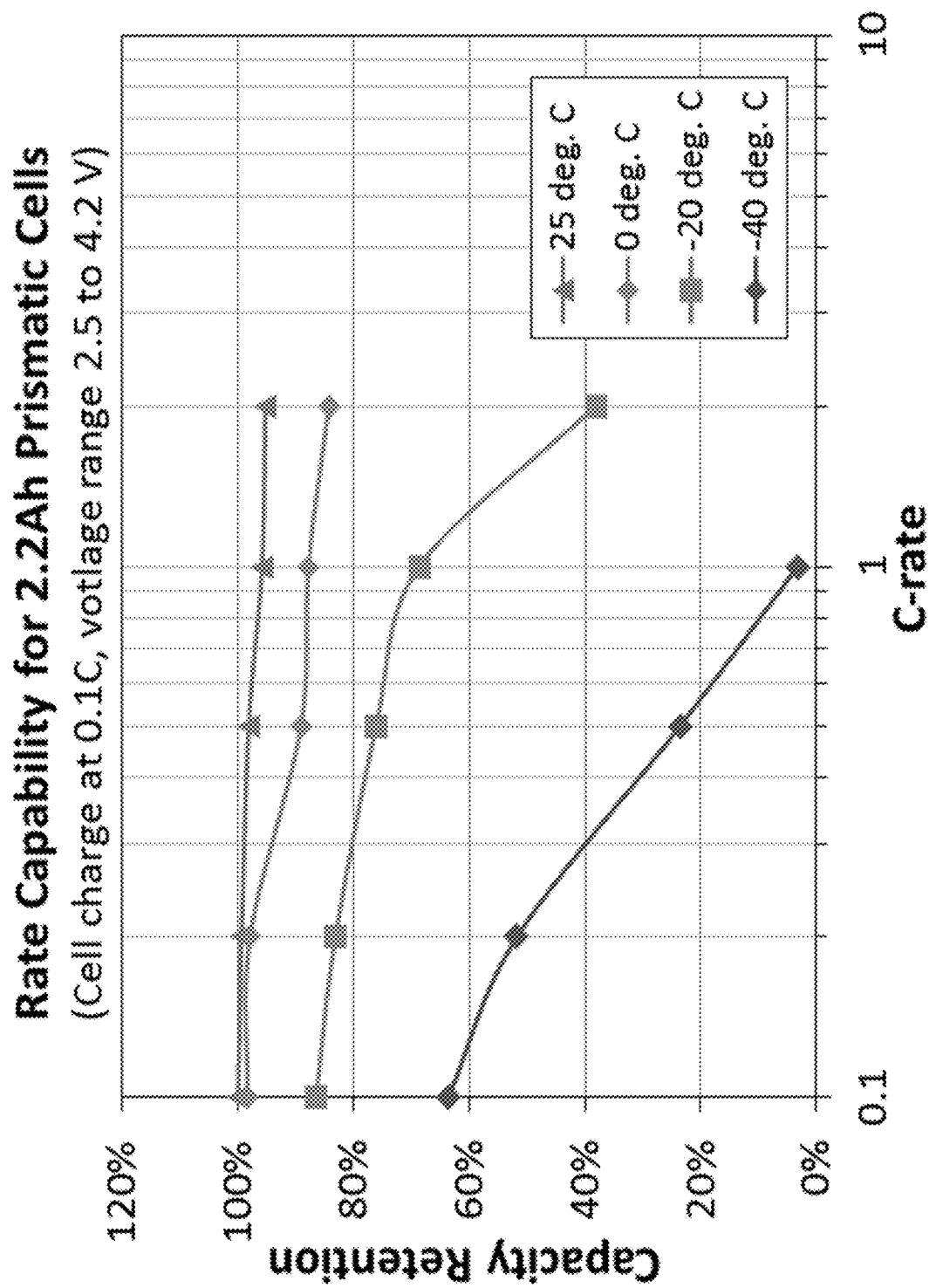
FIG. 10 illustrates cold temperature performance of a cell employing an anode utilizing an electrochemically active material according to sonic aspects as provided herein.

The large format cells were also tested for cold temperature performance. Cells were charged (CCCV) to 4.2V at 0.1C at room temperature (25° C.), then placed inside of an environmental chamber and discharged at different C-rates (0,1, 0.2, 0.5, 1.0, and 2.0C) to 2.5 V at 25° C., 0° C., −20° C. and −40° C. The data at 25° C. was used as baseline. FIG. 10 shows promising low T performance, indicating low resistance cell configuration with Si composite anode. At 0° C. the cell shows almost 100% capacity retention of the baseline at 0.1C and retains more than 80% capacity (compared to 0.1C at 25° C.) up to 2C. At −20° C. the cell shows >85% capacity retention of the baseline at 0.1C and retains more than 70% capacity (compared to 0.1C at 25° C.) at 1C. Even at −40° C. the cell still shows >60% capacity retention of the baseline at 0.1C.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. An electrochemically active material capable of absorbing and desorbing an ion, the material comprising:
   a core consisting of a plurality of silicon particulates of a particle size less than 1 micrometer, the particulates intermixed with and surrounded by a silicon metal alloy composite, or the particulates are surrounded by the silicon metal alloy composite and not intermixed with the silicon metal alloy composite; and
   an electrochemically active buffering shell layer, the shell enveloping at least a portion of the core;
   the material having a maximum linear dimension of greater than one micrometer,
   wherein said electrochemically active material is intermixed with LiPAA.

2. The material of claim 1 wherein the shell comprises carbon.

3. The material of claim 1 wherein the metal in the silicon metal alloy is selected from the group consisting of: Fe, Pb, Mg, Mn, Al, Ag, Au, Ti, Pt, Pd, Ru, Cu, Ni, Ro, or alloys thereof.

4. The material of claim 2 wherein the carbon is natural graphite, graphene, artificial graphite, expanded graphite, carbon fibers, hard carbon, carbon black, carbon nanotubes, fullerenes, activated carbon, or combinations thereof.

5. The material of claim 1 wherein the silicon metal alloy composite is conductive.

6. The electrochemically active material of claim 1 characterized by a cycle life of 80 percent capacity or greater at cycle 40.

7. The electrochemically active material of claim 1 characterized by a cycle life of 80 percent capacity or greater at cycle 100.

8. The electrochemically active material of claim 1 characterized by a specific capacity of at or greater than 800 mAh/g.

9. The electrochemically active material of claim 1 characterized by an initial capacity loss of 20% or less.

10. The electrochemically active material of claim 1 characterized by an initial capacity loss of 12% or less.

11. The electrochemically active material of claim 1 whereby the active material has a surface area of 500 m$^2$/g or less.

12. The electrochemically active material of claim 1 whereby the active material has a surface area of 100 m$^2$/g or less.

13. The electrochemically active material of claim 1 characterized by a tap density of 1.2 or less.

14. The electrochemically active material of claim 1 characterized by a tap density from 0.4-0.9.

15. The electrochemically active material of claim 1 characterized by particle size from greater than 1 micrometer to 100 micrometers.

16. The electrochemically active material of claim 1 characterized by particle size from 5-50 micrometers.

17. An electrochemically active material capable of absorbing and desorbing an ion, the material comprising:
   a core consisting of a plurality of silicon particulates of a particle size less than 1 micrometer, the particulates intermixed with and surrounded by a silicon iron alloy composite; and
   an electrochemically active buffering shell layer comprising carbon, the shell enveloping at least a portion of the core;

the material having a maximum linear dimension of greater than one micrometer, wherein the electrochemically active material is intermixed with a LiPAA binder.

18. The material of claim 17 wherein the carbon is natural graphite, graphene, artificial graphite, expanded graphite, carbon fibers, hard carbon, carbon black, carbon nanotubes, fullerenes, activated carbon, or combinations thereof.

19. An electrochemical cell comprising:

a cathode suitable for use in a lithium ion electrochemical cell;

an anode, the anode comprising an electrochemically active material intermixed with a LiPAA binder; the electrochemically active material comprising:

a core consisting of a plurality of silicon particulates of a particle size less than 1 micrometer, the particulates intermixed with and surrounded by a silicon metal alloy composite, or the particulates are surrounded by the silicon metal alloy composite and not intermixed with the silicon metal alloy composite; and an electrochemically active buffering shell layer, the shell enveloping at least a portion of the core;

the electrochemically active material having a maximum linear dimension of greater than one micrometer;

and an electrolyte.

20. The electrochemical cell of claim 19 wherein the shell comprises carbon.

21. The electrochemical cell of claim 19 wherein the metal in the silicon metal alloy is selected from the group consisting of: Fe, Pb, Mg, Mn, Al, Ag, Au, Ti, Pt, Pd, Ru, Cu, Ni, Ro, or alloys thereof.

22. The electrochemical cell of claim 19 wherein the carbon is natural graphite, graphene, artificial graphite, expanded graphite, carbon fibers, hard carbon, carbon black, carbon nanotubes, fullerenes, activated carbon, or combinations thereof.

23. The electrochemical cell of claim 19 characterized by a cycle life of 80 percent capacity or greater at cycle 100.

* * * * *